No. 32,959.

PATENTED JULY 30, 1861.

O. H. BOGARDUS.
GRADE DELINEATOR.

2 SHEETS—SHEET 1.

Witnesses;

Inventor;
Ora H. Bogardus

No. 32,959. PATENTED JULY 30, 1861.
O. H. BOGARDUS.
GRADE DELINEATOR.

2 SHEETS—SHEET 2.

Witnesses:
R. F. Stevens
A. Barton

Inventor:
Ova H. Bogardus

UNITED STATES PATENT OFFICE.

O. H. BOGARDUS, OF SYRACUSE, NEW YORK.

GRADE-DELINEATOR.

Specification of Letters Patent No. 32,959, dated July 30, 1861.

*To all whom it may concern:*

Be it known that I, O. H. BOGARDUS, of Syracuse, in the county of Onondaga and State of New York, have invented a new and useful Improvement in Engineering Instruments, and do hereby declare the following to be a full, clear, and exact description of the construction and operation of the same, reference being had to the annexed drawings, making part of this specification.

The nature of my invention consists in recording undulations of ground, by an instrument so constructed, that, in its passage along over a surface, it measures and notes its entire horizontal and perpendicular movement.

Figure 1:
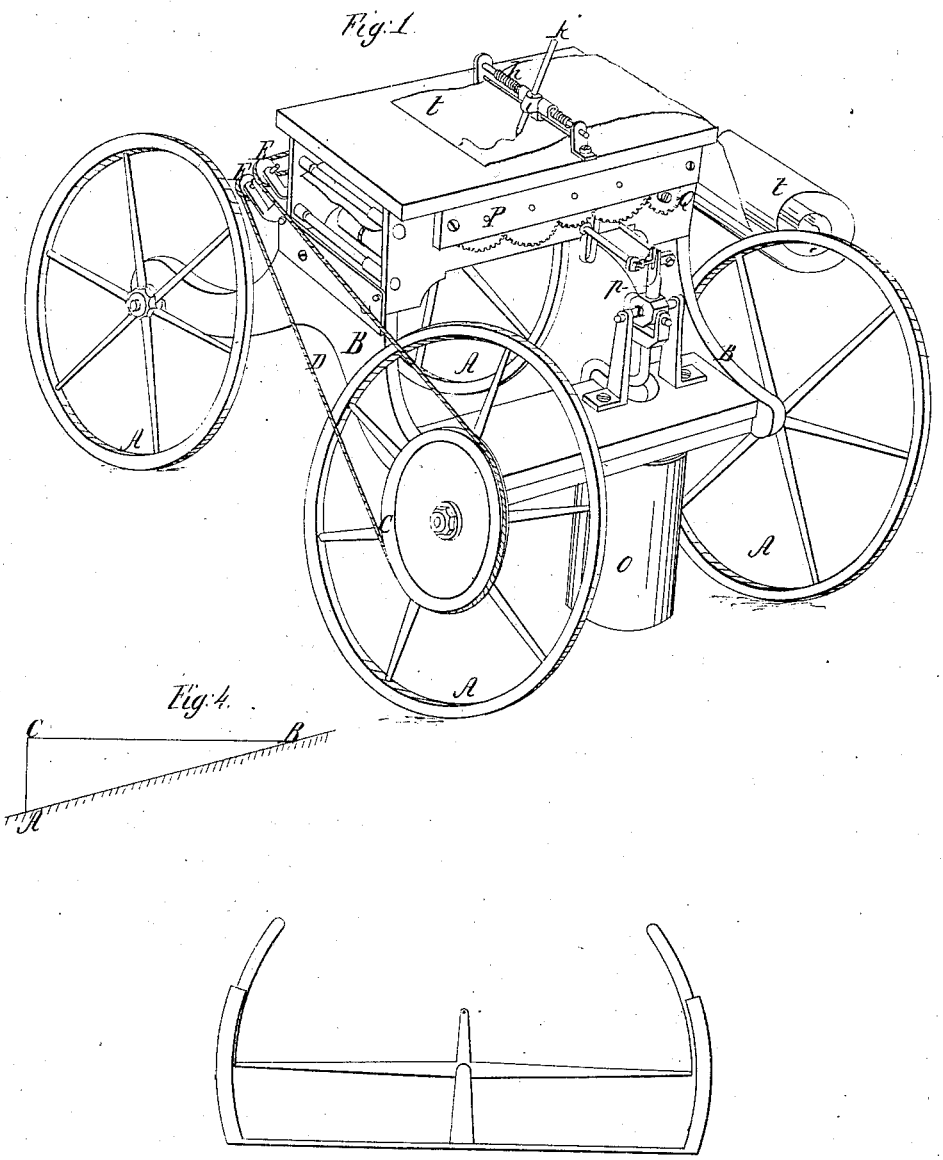
Figure 2:
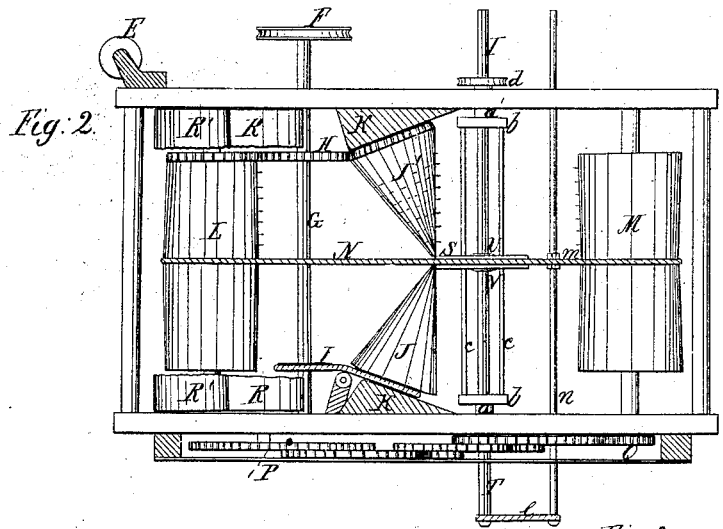
Figure 3:
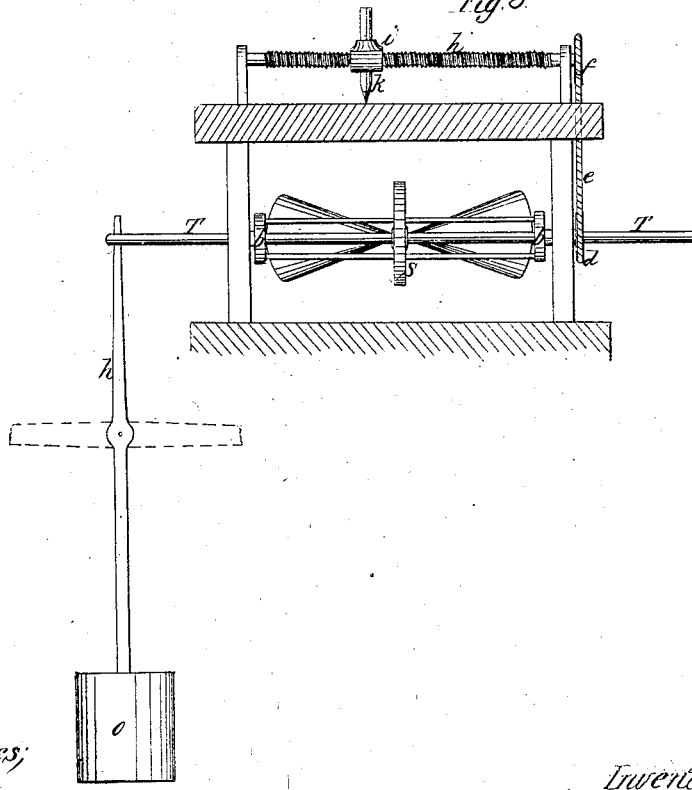

Figure 1 is a general view of the vehicle with the recording instrument. Figs. 2 and 3 are sectional views showing the arrangement of the several parts.

The recording instrument is placed upon a frame (B) which is also mounted upon wheels (A) and is driven by a cord connecting the pulleys (C) and (F), (C) being on the hub of the wheel (A), Fig. 1, and F, on the shaft (G) Fig. 2.

The principle upon which the instrument is constructed and operates is as follows: Upon any inclined surface (A B) Fig. 4 we may construct a right angled triangle, A C B. Making A B radius, A C, and C B, become respectively, sine and cosine of the angle at B, equal to the angle of inclination. A carriage wheel of known diameter as (A) Fig. 1 moving over the line A B Fig. 4 obtains its measure, and being connected with the shaft (G) Fig. 2 imparts to it a proportional motion.

To measure the horizontal (C B) Fig. 4 I have the double frustated pulleys (L and M) of equal diameter at their middle points, but varying toward their ends in this manner. Let them be divided from the middle, each way into any number of spaces which may represent angles of inclination, then must the diameters of (L and M) at equal distances from the middle be in the ratio the one to the other of cosine to radius for the corresponding angle. The pulley (L) receives motion through the cogwheel (H), from the shaft (G), and the pulley (M), through the band (N), from the pulley (L). Their operation is this: When the vehicle moves upon a level surface the band (N) will be at the middle point and give a motion to (M) equal to the motion of (L); but when the vehicle moves upon an inclined surface, the band (N) is shifted by a weight or pendulum to a position corresponding to the angle of inclination, and since the diameters of (L and M) at this point are in the ratio of cosine to radius any motion in the pulley (L) will produce motion in the pulley (M) equal to the cosine of the angle, equal to the horizontal movement of the vehicle.

At (Q) is a cogwheel attached to the shaft of the pulley (M) communicating, and reducing to any desired scale, its motion through the train of clock work (Q P) to the rollers R and R′ carrying the paper. To measure the perpendicular (A C) Fig. 4 I have the cones (J and J′) receiving motion from the shaft (G), one through the cogwheel (H), and the other, in an opposite direction, through the pulley (I). I have also the friction pulley (S), sliding along the cones (J and J′). When the vehicle moves upon a level surface the pulley (S) will be at the points of the cones (J and J′) bearing equally upon both and as the cones revolve in opposite directions the pulley will be at rest, but when the vehicle moves upon an inclined surface the pulley (S) is shifted to a position corresponding to the angle of inclination, and as the diameters of (J or J′) and the pulley (S) are in the ratio of sine to radius, any motion of the cones (J or J′) will give to the pulley (S) a motion equal to the sine of the angle equal to the perpendicular movement of the vehicle.

The pulley (S) is intended to revolve about the rod (T) between the fixed collars (U and V). The rods T and n having a longitudinal sliding motion, are used to shift the pulley (S) and the band (N). (c c) are arms passing loosely through the pulley (S), and connected with the disk (b), the hollow shaft (a′), and giving motion to the pulley (d), thence by the band (e) to the pulley (f) and the screw (h), thereby moving the nut (i) with the marker (k). To move the shifting rods (T and n) I employ a weight (O), suspended by a rod from the crossbar (x) having an arm (p) extending upward connecting loosely with the bar (l).

The pulleys L and M are not strictly double frustums, being slightly curved from the middle to the end, L being convex, and M concave in the direction of its length. These are so made for the reason that the cosine decreases from radius not in a constant but in a varying ratio.

What I claim as my invention and desire to secure by Letters Patent is—

The use of the pulleys L and M in their combination with the driving and recording portions of the instrument to obtain a record of the horizontal movement substantially as shown and described.

OVA H. BOGARDUS.

Witnesses:
R. F. STEVENS,
A. BARTON.